BY-PASS NETWORKS WHEN $f_c < f_a$

BY-PASS NETWORKS WHEN $f_c > f_a$ 3,179,906
Patented Apr. 20, 1965

3,179,906

CRYSTAL BAND ELIMINATION FILTER, HAVING SPURIOUS STOP-BAND, COMBINED WITH BY-PASS NETWORK FOR OBVIATING SPURIOUS RESPONSE

Rodney Oliver Kinsey Turvey, Kent, England, assignor to Associated Electrical Industries Limited, London, England, a British company Filed Sept. 14, 1962, Ser. No. 223,722
Claims priority, application Great Britain, Sept. 19, 1961, 33,534/61
5 Claims. (Cl. 333—72)

The present invention relates to electrical filters, and particularly to band elimination filters, that is to say, filters which highly attenuate currents having frequencies within a specified nominal band, hereinafter referred to as an elimination band, and freely pass currents having frequencies outside this band within a nominal pass-band.

In carrier communications systems it is well known to transmit over a section of the system, a steady tone of constant frequency which acts as a pilot signal for monitoring the performance of that section. In order that such a pilot signal may provide an accurate and consistent measure of the performance of the section, it is desirable that no disturbing signal should be present at the frequency of the pilot signal: for example there should be no residue of a pilot signal of the same frequency from a preceding section. In suppressing such disturbing signals, and also in suppressing the pilot signal at the end of the section to remove it, it is necessary to do so without unduly attenuating or interfering with the remaining speech, telegraph or other signals which are present in the system. Signal suppression can be effected, inter alia, by band elimination filters incorporating piezo-electric crystals, the crystals having a fundamental resonance frequency at the frequency of the signal to be suppressed and being used in the filter to produce an elimination band at that frequency. One of the problems in the design of such crystal band elimination filters is that piezo-electric crystals often possess harmonic or other modes of vibration so that the crystal has secondary resonance frequencies which may result in the production of other, unwanted, elimination bands at frequencies which the filter should pass. It is a disadvantage of some crystal band elimination filters as proposed hitherto that the crystals have to be specially chosen so that such unwanted elimination bands occur outside the pass-band of the filter.

According to the present invention, in a band elimination filter comprising a band elimination network including a piezo-electric crystal the fundamental resonance frequency of which determines a wanted elimination band, unwanted band elimination due to a secondary resonance of the crystal is minimised by connecting in series with the input and with the output of the band elimination network respective parallel tuned circuits each designed to provide a high impedance at said secondary resonance frequency of the crystal, and by connecting in parallel with the overall circuit arrangement of said network and the parallel tuned circuits a by-pass network having a high impedance at the funadmental resonance frequency of the crystal and a low impedance at said secondary resonance frequency.

The nature of the invention and its mode of operation may be more fully understood by consideration of an embodiment thereof which will now be described with reference to the accompanying drawings in which.

Figure 1:
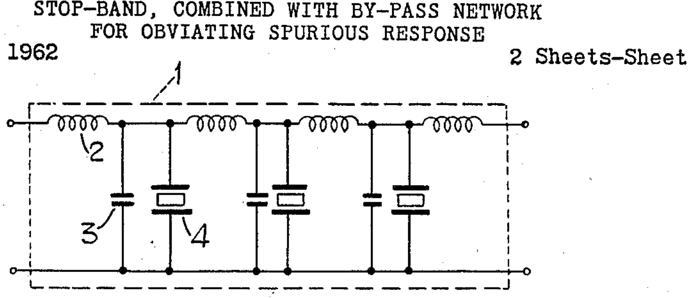
FIG. 1 is a circuit diagram of a low-pass network of known type incorporating piezo-electric crystals.
Figure 2:
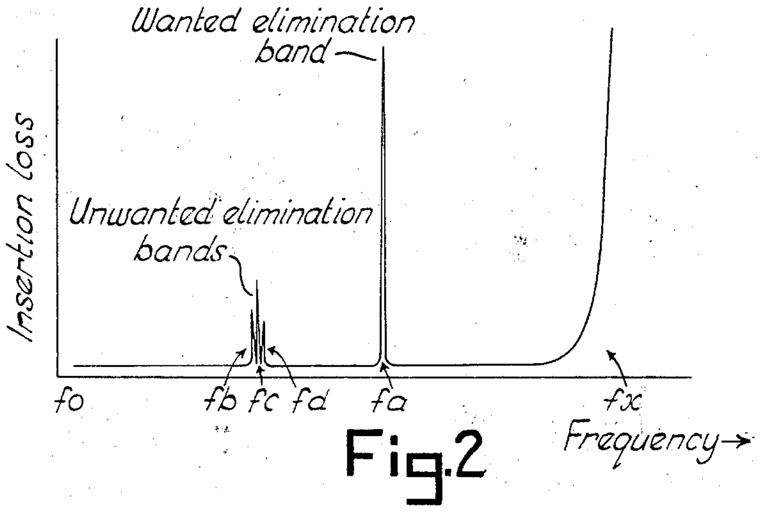
FIG. 2 is a schematic diagram of an insertion loss-frequency characteristic curve of the type of filter shown in FIG. 1.

Referring in the first instance to FIGS. 1 and 2, a low-pass network 1 has series arms formed by inductors 2, shunt arms formed by capacitors 3 and a crystal 4 connected in parallel with each shunt arm. The crystals 4 may be regarded as capacitive at all frequencies except those close to their fundamental resonance frequencies or close to the resonance frequencies of their other modes of vibration and harmonics of these frequencies where they offer low impedance. Thus, the insertion loss-frequency characteristic curve of the low-pass network 1, as will be seen from FIG. 2, is essentially that of a non-crystal low-pass network except that at, or close to the crystal fundamental resonance frequency *fa* a wanted elimination band appears, and that at, or close to frequencies *fb*, *fc*, and *fd* (which are other resonance frequencies of the crystals), other unwanted elimination bands appear. It will be appreciated that while the unwanted elimination bands shown in FIG. 2 appear at a frequency less than the wanted elimination band they can also appear at a frequency greater than the wanted elimination band. Similar unwanted elimination bands may appear when crystals are incorporated in high-pass or band-pass networks to provide a wanted elimination band.

Figure 3:
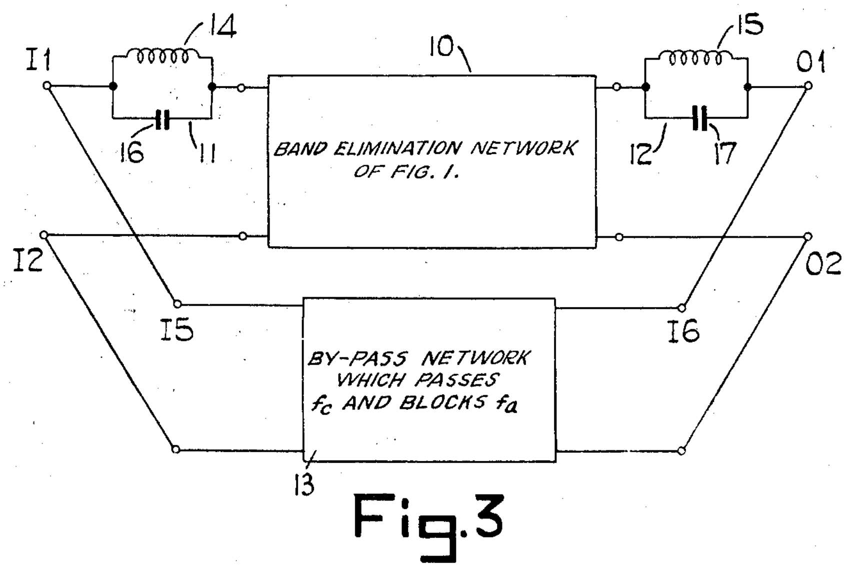
FIG. 3 is a schematic circuit diagram of a band elimination filter in accordance with the present invention.

Referring now to FIG. 3, a crystal band elimination filter designed to minimise unwanted band elimination includes, in addition to a band elimination network 10 which will be assumed to be a low-pass network as shown in FIG. 1 but could be a high-pass or band-pass network incorporating crystals as previously mentioned, two parallel tuned circuits 11 and 12 and a by-pass network 13. The parallel tuned circuits 11 and 12 are connected in series with the input and with the output, respectively, of the network 10, forming with it an overall circuit arrangement having a pair of input terminals I1, I2 and a pair of output terminals O1, O2 between which terminal pairs the by-pass network 13 is also connected so as to be in parallel with the circuit arrangement of the network 10 and circuits 11 and 12. The band elimination network 10 may also include at its input and output, suitable coupling transformers to match the impedance of the network 10 to any terminating impedance which will be connected to input terminals I1 and I2 and output terminals O1, O2. Assuming that only one unwanted elimination band is present, the parallel tuned circuits 11 and 12 are designed by suitable choice of their inductors 14 and 15 and their capacitors 16 and 17 to resonate at the mean frequency of the unwanted elimination band, say *fb*, so that each tuned circuit has a high impedance at frequencies close to *fb*. The by-pass network 13 is designed to pass signals at the frequencies of the unwanted elimination band and to highly attenuate signals at the frequencies of the wanted elimination band.

The arrangement so far described functions in the following manner. When an input comprising signals in the nominal pass-band of network 10 (that is in the frequency range *fo*–*fx* FIG. 2) is applied between input terminals I1 and I2, signals at the frequencies of the wanted elimination band are highly attenuated by the band elimination network 10 and by the by-pass network 13; consequently they do not appear to any significant extent at output terminals O1, O2. Signals at the frequencies of the unwanted elimination band are prevented from passing to the band elimination network 10 where the crystals 4 would constitute a shunt path by the high impedance presented by tuned circuits 11 and 12. Consequently signals at the frequency of the unwanted elimination band pass to the output terminals O1 and O2 by way of by-pass network 13 which presents a low impedance to them. Signals at all other frequencies can pass to the output terminals O1, O2 by way of either the band elimination network 10 or the by-pass network 13 depending on their frequencies so that the insertion loss-frequency characteristic is substantially that of a non-crystal low-pass filter except for the one elimination band close to the resonant frequency of the crystals *fa*.

Figure 4:
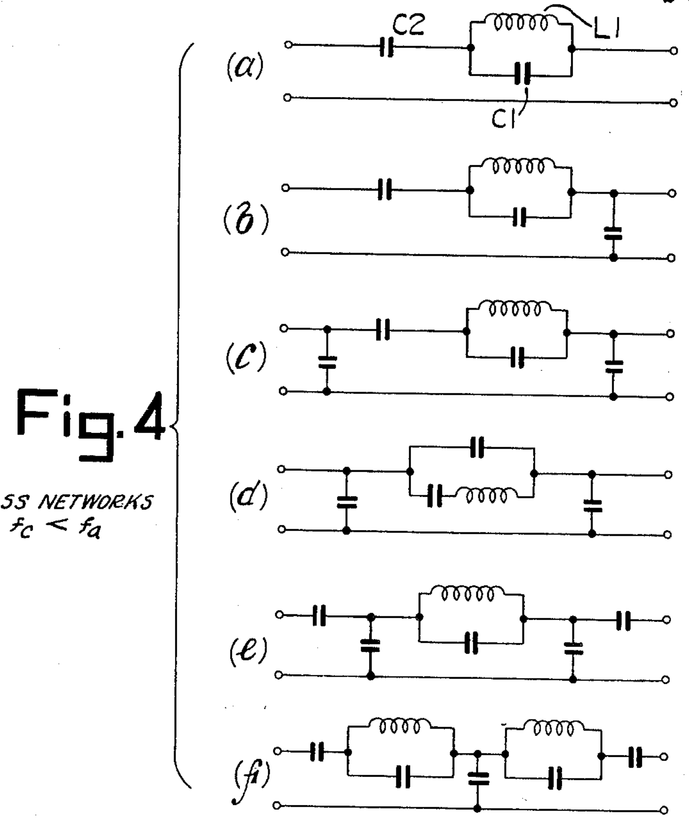
FIG. 4 shows circuit diagrams of certain alternative circuits that can be used for the by-pass network represented in block form in FIG. 3.
Figure 5:
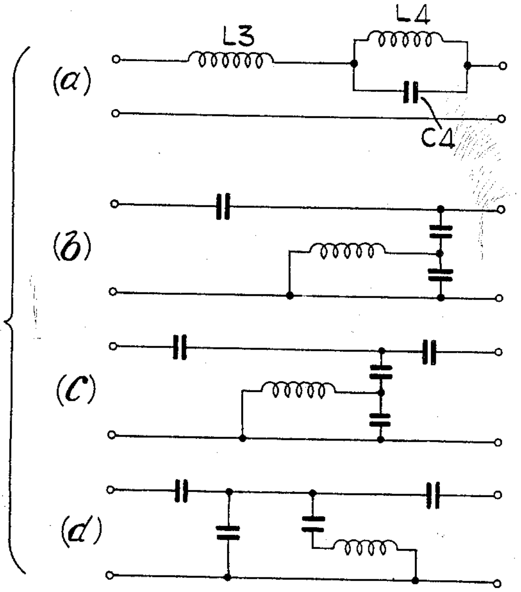
FIG. 5 shows circuit diagrams of further alternative circuits that can be used for the by-pass network represented in block form in FIG. 3.

Taking as an example the case where there is only one unwanted elimination band, or several of these bands in very close proximity as for example at frequencies close to *fb*, *fc* and *fd*, the tuned circuits 11 and 12 can be designed according to the following principles. Firstly, the reactance of the tuned circuits 11 and 12 throughout the unwanted elimination band or bands should be considerably greater than any terminating impedances which will be connected to input terminals I1 and I2 or out-put terminals O1, O2, say fifteen times greater, and secondly the inductors 14 and 15 should have the smallest inductance value which is capable of tuning the tuned circuits 11 and 12 and which is compatible with practical coil design, in order to reduce the insertion loss of the tuned circuits 11 and 12 at frequencies other than those of the unwanted elimination bands. The by-pass network 13 can take several forms some of which are shown in FIGS. 4 and 5. When the mean frequency of the unwanted elimination band, or the mean frequency of several such bands in close proximity with each other, is below the frequency of the wanted elimination band the circuits shown in FIG. 4 are suitable.

Taking as an example the circuit in FIG. 4*a* which comprises a capacitor C2 connected in series with a parallel arrangement constituted by an inductor L1 and a capacitor C1, the by-pass network 13 can be designed according to the following principles. Firstly the values of the inductor L1 and capacitors C1 and C2 are so chosen that the series resonance frequency of the circuit, which is given by the formula $$\frac{1}{2\pi}\sqrt{\frac{1}{L1(C1+C2)}}$$

is equal to the resonance frequency of parallel tuned circuits 11 and 12, and secondly the values of inductors L1 and capacitor C1 are chosen so that the parallel resonance frequency of the circuit which is given by the formula $$\frac{1}{2\pi\sqrt{L1.C1}}$$

is equal to the mean frequency of the wanted elimination band. The characteristic impedance of the by-pass network 13 should be such that the attenuation at frequencies at or near the wanted elimination band has a uniformly high value and that the insertion loss at the series resonance frequency is negligible. This can be achieved in the circuit of FIG. 4*a* by choosing for inductor L1 the highest possible value of inductance which is capable of satisfying both the above formulae, and by designing the inductor L1 so that it has a high Q value at the series resonance frequency. Trimming capacitors can be connected in shunt with capacitor C2 or in shunt with one or more of the crystals in the band elimination network, to afford a measure of adjustment of the characteristic impedance.

The by-pass network 13 can also take the form of a band-pass half $\pi$ or full $\pi$ sections as shown in FIGS. 4*b*–4*e*, designed so that the lower cut-off frequency of the pass-band is equal to the resonance frequency of parallel tuned circuits 11 and 12 and the upper cut-off frequency of the pass-band is at the frequency at which the insertion loss of tuned circuits 11 and 12 is within a few db (that is no more than about 2 or 3 db) of the pass-band loss. It may be necessary to use more than one such band-pass section if it is found that the network 13 excessively reduces the attenuation of the wanted elimination band. The characteristic impedance of the network 13 can be chosen to suit the system in which the band elimination filter is incorporated, but it has been found that optimum return and transmission losses are obtained if the image impedance of the band-pass sections at the mid-pass band frequency is between three and five times the image impedance of band elimination network 10. Mismatch losses in the band-pass of the whole arrangement can be reduced or eliminated by the adjustment of suitable trimming capacitors provided in the band elimination network 10 or the by-pass network 13, or by changing the configurations of the by-pass network 13 from $\pi$ to T section, for example, from that shown in FIG. 4*c* to that shown in FIG. 4*f*.

When the mean frequency of an unwanted elimination band is greater than the frequency of the wanted elimination band the circuits shown in FIG. 5 are suitable for the by-pass network 13. Taking as an example the circuit shown in FIG. 5*a* which comprises an inductance L3 connected in series with a parallel arrangement of an inductance L4 and a capacitance C4; as before the series resonance frequency of the circuit, which is given by the formula $$\frac{1}{2\pi}\sqrt{\frac{1}{\frac{(L4L3)}{(L4+L3)}C4}}$$

is made equal to the resonance frequencies of parallel tuned circuits 11 and 12, and the parallel resonance frequency which is given by formula $$\frac{1}{2\pi}\sqrt{\frac{1}{L4.C4}}$$

is made equal to the frequency of the wanted elimination band. As before more complex circuits can be used such as the half-T section network shown in FIG. 5*b*, or the $\pi$-section networks shown in FIGS. 5*c* and 5*d* but this time the upper cut-off frequency of the pass band is arranged to occur at the mean frequency of the unwanted elimination band and the lower cut-off frequency is arranged to occur at the frequency at which the insertion loss of tuned circuits 11 and 12 is within a few db of the pass band loss.

What I claim is:

1. A band elimination filter comprising a band elimination network including a piezo-electric crystal having a fundamental resonance frequency which determines a wanted elimination band, a secondary resonance frequency which produces an unwanted elimination band, two parallel tuned circuits connected in series with the input and with the output, respectively, of said band elimination network and providing a high impedance at said secondary resonance frequency, and a by-pass network connected in parallel with the overall circuit arrangement of the band elimination network and tuned circuits, said by-pass network having a high impedance at said fundamental resonance frequency and a low impedance at said secondary resonance frequency, said crystal having several secondary resonance frequencies in close proximity to each other and said by-pass network having a pass-band including these frequencies, said by-pass network having an image impedance between three and five times the image impedance of said band elimination network.

2. A band elimination filter as claimed in claim 1, in which the secondary resonance frequencies are below the fundamental resonance frequency and the by-pass network has a lower cut-off at the resonance frequency of the said parallel tuned circuits and an upper cut-off at a frequency at which the insertion loss of the said tuned circuits is within a few db of the pass-band loss.

3. A band elimination filter as claimed in claim 1, in which the secondary resonance frequencies are above the fundamental resonance frequency and the by-pass network has an upper cut-off at the resonance frequency of the said parallel tuned circuits and a lower cut-off at a frequency at which the insertion loss of the said tuned circuits is within a few db of the pass-band loss.

4. A band elimination filter as claimed in claim 1 wherein said by-pass network has a series resonance frequency equal to the resonance frequency of said parallel tuned circuits and a parallel resonance frequency equal to the mean frequency of said wanted elimination band.

5. A band elimination filter as claimed in claim 1 wherein said by-pass network has a band-pass section such that the lower cut-off frequency of said parallel tuned circuits and the upper cut-off frequency of the pass-band is equal to the frequency at which the insertion loss of said parallel tuned circuits is within 3 db of the pass-band loss.

References Cited by the Examiner

UNITED STATES PATENTS

| | | | |
|---|---|---|---|
| 2,065,565 | 12/36 | Crosby | 333—72 |
| 2,076,248 | 4/37 | Norton | 333—8 |
| 2,088,203 | 7/37 | Hansell | 333—72 |
| 2,248,776 | 7/41 | Och | 333—72 |
| 2,640,879 | 6/53 | Tournier | 333—72 |
| 2,913,682 | 11/59 | Kosowsky | 333—72 |
| 3,009,120 | 11/61 | Robson | 333—72 |

HERMAN KARL SAALBACH, *Primary Examiner.*